United States Patent
Wong et al.

(10) Patent No.: US 9,687,055 B2
(45) Date of Patent: Jun. 27, 2017

(54) CARRIER

(71) Applicant: Siu Ling Wong, Hong Kong (CN)

(72) Inventors: Siu Ling Wong, Hong Kong (CN); Wan Sze Vincci Ching, Hong Kong (CN)

(73) Assignee: Siu Ling Wong, Hong Kong (CN)

( * ) Notice: Subject to any disclaimer, the term of this patent is extended or adjusted under 35 U.S.C. 154(b) by 16 days.

(21) Appl. No.: 14/730,084

(22) Filed: Jun. 3, 2015

(65) Prior Publication Data

US 2015/0305466 A1 Oct. 29, 2015

Related U.S. Application Data

(63) Continuation-in-part of application No. PCT/CN2013/077745, filed on Jun. 24, 2013.

(30) Foreign Application Priority Data

Jan. 28, 2013 (HK) ................................. 13101210.7

(51) Int. Cl.
*F21L 4/00* (2006.01)
*A45C 15/06* (2006.01)
(Continued)

(52) U.S. Cl.
CPC ................ *A45C 15/06* (2013.01); *A45C 3/06* (2013.01); *A45C 13/02* (2013.01); *F21L 4/00* (2013.01);
(Continued)

(58) Field of Classification Search
CPC . A45C 13/02; A45C 15/06; A45C 3/06; F21L 4/00; F21V 23/0414; F21V 33/0008; G02B 6/0006; F21Y 2101/00; A45D 33/32
See application file for complete search history.

(56) References Cited

U.S. PATENT DOCUMENTS

| | | | |
|---|---|---|---|
| 6,447,142 B1* | 9/2002 | Weir | A45C 15/06 150/100 |
| 2004/0090773 A1* | 5/2004 | Bryan | A45C 3/08 362/156 |

(Continued)

FOREIGN PATENT DOCUMENTS

| | | |
|---|---|---|
| CN | 2590427 | 12/2003 |
| CN | 2896983 | 5/2007 |

(Continued)

OTHER PUBLICATIONS

International Search Report mailed Oct. 31, 2013 for PCT/CN2013/077745 and its English translation.
(Continued)

*Primary Examiner* — Peggy Neils
(74) *Attorney, Agent, or Firm* — Ladas & Parry, LLP; Melvin Li

(57) ABSTRACT

There is provided a carrier. The carrier comprises an inner lining arranged in the carrier, the lining providing a cavity in which items are carried in the carrier. The carrier includes an illumination system having light transmitting fibers in or at the lining for illumination of the cavity, a light source for feeding lighting to said fibers or otherwise providing illumination in the cavity, a switch for controlling operation of light source, a power source for providing power to illumination system, and a capacitor for controlling duration of illumination of light source.

18 Claims, 2 Drawing Sheets

(51) Int. Cl.
    *A45C 3/06*     (2006.01)
    *A45C 13/02*     (2006.01)
    *F21V 23/04*     (2006.01)
    *F21V 33/00*     (2006.01)
    *F21V 8/00*     (2006.01)
    *F21Y 115/10*     (2016.01)

(52) U.S. Cl.
    CPC ...... *F21V 23/0414* (2013.01); *F21V 33/0008* (2013.01); *G02B 6/0006* (2013.01); *F21Y 2115/10* (2016.08)

(56) References Cited

U.S. PATENT DOCUMENTS

| | | | |
|---|---|---|---|
| 2004/0141314 A1* | 7/2004 | Vautrin | A45C 15/06 362/156 |
| 2006/0087832 A1 | 4/2006 | Peng et al. | |
| 2007/0008714 A1* | 1/2007 | Kilfedder | A44B 19/24 362/103 |
| 2012/0147594 A1* | 6/2012 | Tait | A45C 3/06 362/156 |
| 2013/0250603 A1* | 9/2013 | Begriche | A45C 15/06 362/554 |

FOREIGN PATENT DOCUMENTS

| GB | 2470888 | 12/2010 |
|---|---|---|
| HK | 1087591 | 10/2006 |

OTHER PUBLICATIONS

PCT International Written Opinion from PCT/CN2013/077745 dated Oct. 31, 2013, and its English translation from WIPO.
PCT International Preliminary Report on Patentability Chapter I from PCT/CN2013/077745 dated Jul. 28, 2015, and its English translation from WIPO.

* cited by examiner

CARRIER

CROSS REFERENCE TO RELATED APPLICATIONS

The present application is a continuation-in-part application from International Application No. PCT/CN2013/077745 (WO2014/1140525A1) filed on Jun. 24, 2013 which claims priority from Hong Kong Patent Application No. HK13101210.7 filed Jan. 28, 2013, contents of both PCT/CN2013/077745 and HK13101210.7 are incorporated herein in their entirety.

FIELD OF THE INVENTION

The present invention is concerned with an improved carrier configured to allow a user to locate items therein easily.

BACKGROUND OF THE INVENTION

There are a variety of carriers such as handbags, backpacks, briefcases, etc. While they are useful in that they allow a user to carry items, looking for items therein are often not easy at least in certain environmental conditions.

The present invention seeks to address these issues or at least to provide an alternative to the public.

SUMMARY OF THE INVENTION

According to a first aspect of the present invention, there is provided a carrier comprising an inner lining arranged in the carrier, the lining providing a cavity in which items are carried in the carrier, wherein the carrier includes an illumination system having light transmitting fibers in or at the lining for illumination of the cavity, a light source for feeding lighting to the fibers, a switch for controlling operation of the light source, a power source for providing power to the illumination system, and a capacitor for controlling duration of illumination of the light source.

Preferably, the lining may be in the form of a fabric woven, knitting or other formed from materials including optical fibers. Content of the optical fibers in the materials may be sufficient to illuminate entirety of the cavity.

Advantageously, the light source may be in the form of a LED light source.

In an embodiment, the light source may be embedded in the lining.

In one embodiment, the carrier may comprise a main body having a rim defining an access to the cavity, closing of the rim turns off the switch and opening of the rim turns on the switch. The carrier may comprise a locking means configured to assume a first configuration in which the access is closed or a second configuration in which the access is open. The locking means may include a first member arranged on one side of the rim and a second member arranged on an opposite side of the rim, and may be configured to be magnetically attracted together for closing the access.

Preferably, the capacitor may control maximum duration of illumination after turning on of the switch.

Advantageously, the illumination system may include a resistor for controlling degree of illumination.

In another embodiment, the illumination system may define a circuitry including a charging circuit of a battery, the switch and the capacitor, and a discharging circuit of the capacitor, the switch and the light source, switching between the charging circuit and discharging circuit determines status of illumination. The carrier may be configured such that turning off of the switch activates charging of said capacitor, and/or configured such that turning on of the switch allows the light source being powered by the capacitor.

Preferably, the carrier may be free of timing chip or relay.

The carrier may be in the form of a handbag, a shoulder bag, or a backpack.

According to a second aspect of the present invention, there is provided an illumination system for use in a carrier, comprising an inner lining providing a cavity in which items are situated, wherein the illumination system includes light transmitting fibers in or at the lining for illumination of the items in the cavity, a light source for feeding lighting to the fibers, a switch for controlling operation of the light source, and a power source for providing power for operation of the illumination system. The illumination system may define a circuitry including a charging circuit (a first circuit path) of a battery, the switch and a capacitor, and a discharging circuit (a second circuit path) of the capacitor, the switch and the light source, switching between the charging circuit and discharging circuit determines status of illumination, whereby turning off of the switch activates charging of the capacitor and turning on of so the switch allows the light source being powered by the capacitor. The system may be free of timing chip or relay.

BRIEF DESCRIPTION OF THE DRAWINGS

Some embodiments of the present invention will now be explained, with reference to the accompanied drawings, in which.

DETAILED DESCRIPTION OF PREFERRED EMBODIMENTS OF THE INVENTION

There are a variety of conventional carriers such as handbags, backpacks, suitcases, etc. The primary purpose of the carriers is to store or carry items. It is not uncommon that a user would use a carrier to carry many items including small objects in a carrier. Studies leading to the present invention reveals that searching for a particular item (e.g. small object) from among the many items in the carrier can often be a challenging task. For example, regardless of the ambient light conditions, the interior of the carrier is necessarily darker because the interior is shielded by the body of the carrier. As such, searching for a desired item in a darker condition is necessarily difficult. The situation is made worse when there is minimal or no ambient light. In such circumstances, a user would be unable to look for the desirable item visually, but rather identify the desirable by feeling his/her way through in no the carrier.

Some embodiments of the present invention provides a bag capable of emitting light. The bag comprises a bag main body and a light-emitting system mounted in the bag main body. The main body has an inner lining made of fiber optics. The light-emitting system comprises a power source, a switch and a light source such as a lamp. The inner lining is woven from the fiber optics. The lamp is embedded in the optic fibers. The power source supplies power to the lamp such that it emits light and the emitted light enters the optic fibers such that the optic fibers also emit light. The on or off of the light source is controlled by the switch.

Figure 3:
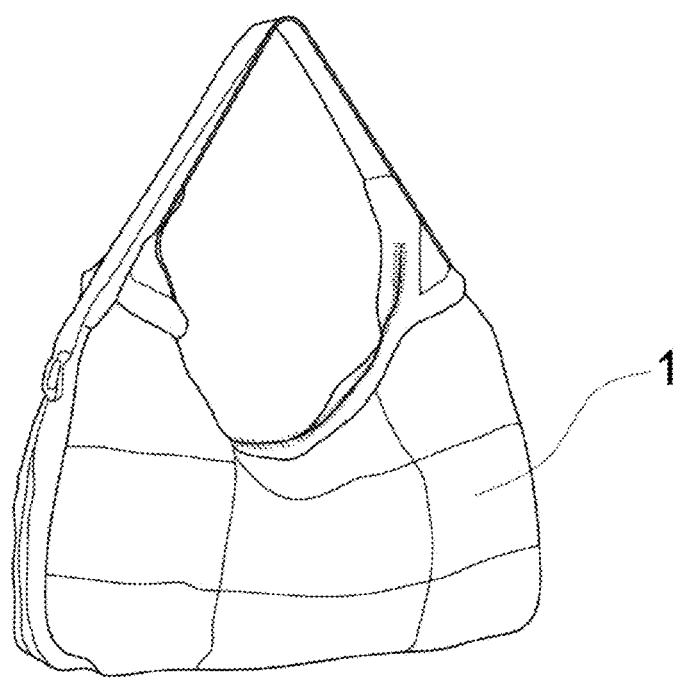
FIG. 3 is a schematic view of an embodiment of a carrier in according to the present invention, the carrier in a closed configuration.
Figure 4:
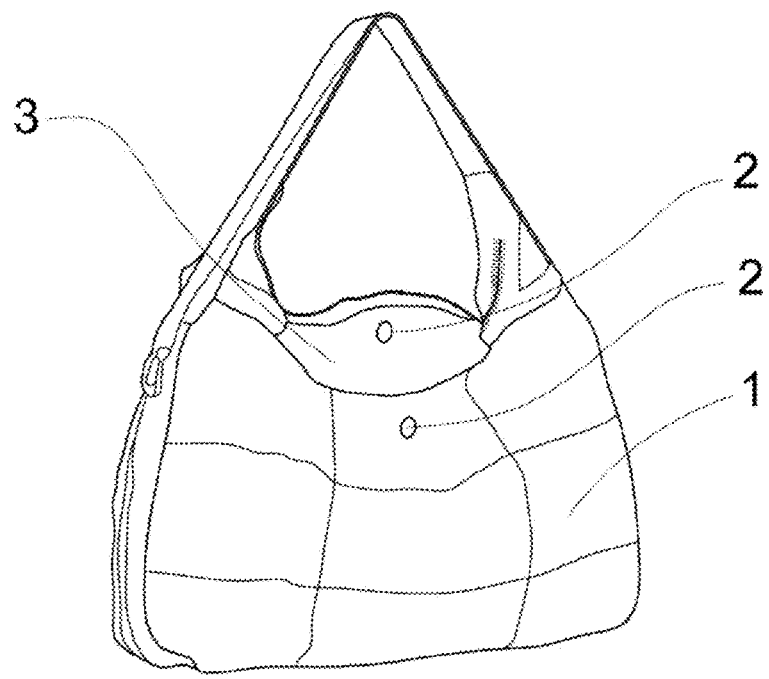
FIG. 4 shows the carrier of FIG. 4 in an open configuration.

Referring to specific embodiments, an embodiment of the present invention is concerned with a handbag, illustrated schematically in FIG. 3 and generally designated. The handbag comprises a main body 1 with an externally facing portion made of a soft material, an strap acting as a handle with which a user can hold, an upper rim defining an opening via which access to an interior of the handbag can be achieved, an inner lining defining a cavity in the handbag for containing items to be carried, and an illumination system. FIG. 3 shows the handbag in a first configuration in which the opening is collapsed such that access to the interior is denied. FIG. 4 however shows the handbag in a second configuration in which the opening is enlarged allowing access to the interior.

Referring to FIG. 4, the handbag is provided with a locking mechanism 2 for bringing the rim together, thus closing the opening. The locking mechanism 2 includes a first member arranged on one side of the rim and a second member arranged on an opposite side of the rim. In this embodiment, the first and second member are configured to be magnetically attractable together. Thus, when the first and second members are brought together, the opening of the handbag is closed, thus securing storage of items in the handbag during travel.

Still referring to FIG. 4, the inner lining 3 is made of a fabric comprising lighting optical fibers. The illumination system includes a circuitry of a battery E, an electrical switch K, a capacitor C, a light source L, a resistor and the optical fibers. In this embodiment, the electrical switch K and the locking mechanism 2 are made of one integral component such that when the first and second members are disengaged the electrical switch is turned off. The light source is connected, and arranged to feed lighting therefrom, to the optical fibers for illumination of the cavity in the handbag. The resistor is provided to allow adjustment of current passable in the illumination system, thus to adjust the degree of possible illumination in the handbag.

Figure 1:
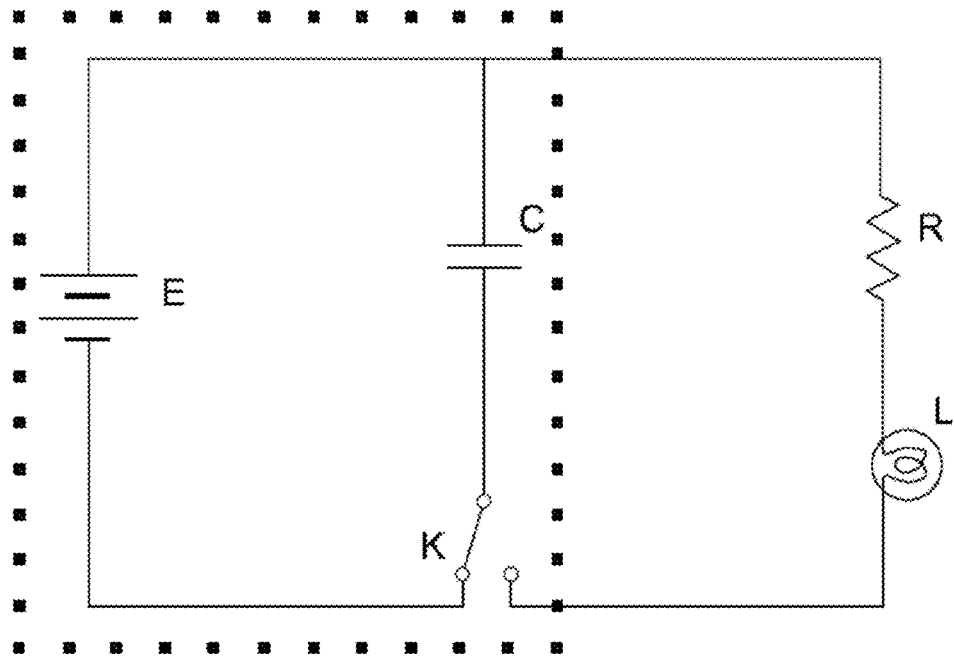
FIG. 1 shows a circuit diagram of an embodiment of a carrier according to the present invention, the carrier being in a closed configuration.
Figure 2:
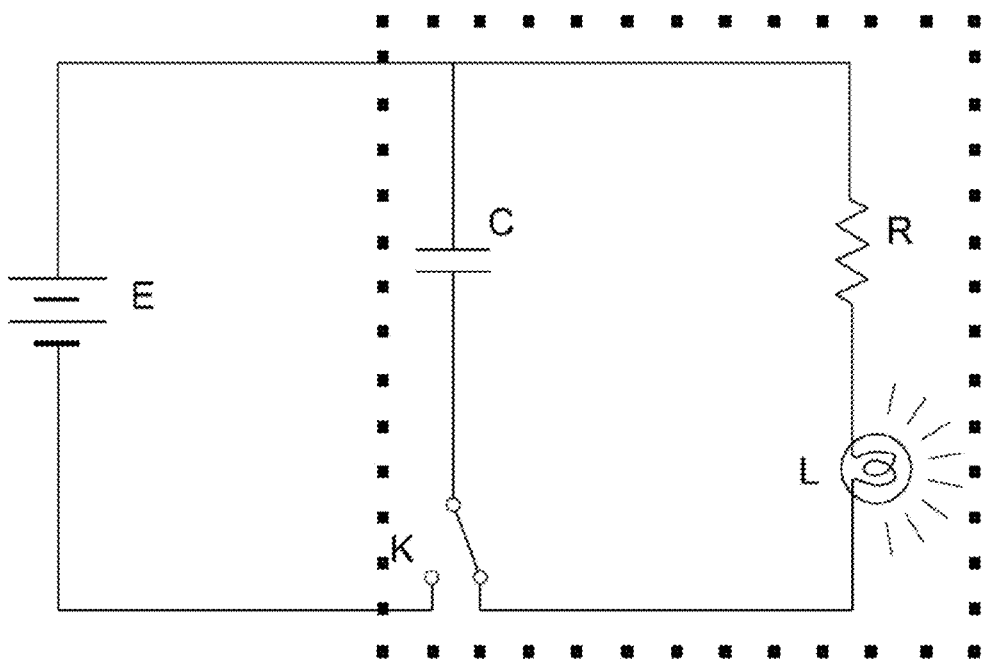
FIG. 2 shows a circuit diagram of the carrier of FIG. 1, the carrier being an open configuration.

In some embodiments, the bag capable of emitting light further comprises a capacitor C. The switch K is a magnetic switch. The power source E, the capacitor C, the switch K and the lamp L form a capacitor charging and discharging circuit. The illumination system includes a charging circuit as illustrated in FIG. 1 and a discharging circuit as illustrated in FIG. 2. The charging circuit is kicked in when the locking mechanism is set at the locking status, meaning the handbag is closed, and when the electrical switch K is turned to a charging status. In this circuit state, the capacitor C is adapted to be charged up by the battery E to its full capacity. In this circuit state, the light source L is not light up because no electrical current passes the light source.

The discharging circuit is kicked in when the locking mechanism is set at the unlocking status, meaning the handbag is open, and when the electrical switch K is turned to a discharging status. In this circuit state, the capacitor C is adapted to supply stored electrical power to the light source L, until such time when the stored electrical power is depleted.

It is thus envisaged that the charging or discharging of the capacitor C is determined by switching of the switch K, while the switching of the switch K is determined by opening or closing of the bag. The switch K switches the charging circuit on when the bag is closed, and the current flows from the power source E to the capacitor C and ceases when the capacitor C is fully charged, as shown in FIG. 1. During this charging process, the lamp L does not emit light, and the status of the bag when it is closed is shown in FIG. 3. The switch K switches the discharging circuit on when the bag is opened and the current flows from the capacitor C to the lamp L such that it emits light, as shown in FIG. 2. Since in this embodiment the lamp L is embedded in the optic fibers, the light emitted by the lamp L enters the optic fibers and travels therein. In this embodiment, not all the light is reflected because a portion of the light is reflected and guided in the optic fibers, while another portion of the light is refracted and emits out of the optic fibers. As a result, the entire optic fibers also emit light. Because in this embodiment the entire inner lining 3 is formed of the optic fibers, the entire inner lining 3 emits light. Therefore, the inner lining 3 starts emitting light as soon as the bag is opened, making finding items in the bag especially in the dark extremely easier. The status of the bag when it is opened is shown in FIG. 4. In FIG. 4, the reference sign 2 represents the switch K. When the bag is closed again, the switch K switches the charging circuit on and the discharging circuit off, the circuit returns to charging mode, and the lamp L does not emit light any longer.

Since the capacity of the capacitor C is limited, when the capacitor is depleted, the lamp L does not emit light and the inner lining 3 correspondingly does not emit light. Therefore, the capacity limit of the capacitor C serves to limit the duration of light emission of the inner lining 3.

It is envisaged that the light source L may be an LED lamp.

In some embodiments, the capacitor charging and discharging circuit further comprises a current limiting resistor R disposed on the discharging circuit for limiting current of the discharging circuit to protect the lamp L, as shown in FIG. 1 or FIG. 2.

It is envisaged that the handbag may be a handbag, a shoulder bag, or a backpack.

It is thus understandable that the present invention can alleviate the disadvantages associated with conventional bags, including conventional bags with complex electrical systems, systems which have a high demand of electrical power, systems which take up precious space or adds to the weight of the carrier, or systems which can be allow full illumination of cavity in the carrier.

Although the embodiments of the present invention are described above with reference to the drawings and by way of examples, the present invention is not limited to these embodiments which are illustrative only rather than restrictive. Those skilled in the art will be able to make various modifications and/or alterations under teaching of present utility model, without departing from the spirit of the present utility model and the scope of the appended claims, which fall into the protection scope of the present utility model.

The invention claimed is:

1. A carrier comprising an inner lining arranged in said carrier, said lining providing a cavity in which items are carried in said carrier, wherein said carrier includes an illumination system having light transmitting fibers in or at said lining for illumination of the cavity, a light source for feeding lighting to said fibers or otherwise illumination in the cavity, a switch for controlling operation of said light source, a power source for providing power only to a capacitor of said illumination system, wherein the capacitor is configured to provide power only to said light source and to control duration of illumination of said light source; wherein the carrier is free of a timing chip.

2. A carrier as claimed in claim 1, wherein said lining is in the form of a fabric woven, knitting or other formed from materials including optical fibers.

3. A carrier as claimed in claim 2, wherein content of said optical fibers in said materials is sufficient to illuminate entirety of the cavity.

4. A carrier as claimed in claim 1, wherein said light source is in the form of a LED light source.

5. A carrier as claimed in claim 1, wherein said light source is embedded in said lining.

6. A carrier as claimed in claim 1, comprising a main body having a rim defining an access to the cavity, closing of said rim turns off said switch and opening of said rim turns on said switch.

7. A carrier as claimed in claim 6, comprising a locking means configured to assume a first configuration in which the access is closed or a second configuration in which the access is open.

8. A carrier as claimed in claim 6, wherein said locking means includes a first member arranged on one side of the rim and a second member arranged on an opposite side of the rim, and are magnetically attracted together for closing the access.

9. A carrier as claimed in claim 1, wherein said capacitor controls maximum duration of illumination after turning on of said switch.

10. A carrier as claimed in claim 1, wherein said illumination system includes a resistor for controlling degree of illumination.

11. A carrier as claimed in claim 1, wherein said illumination system defines a circuitry including a charging circuit of a battery, said switch and said capacitor, and a discharging circuit of said capacitor, the switch and said light source, switching between the charging and discharging circuits determines status of illumination.

12. A carrier as claimed in claim 11, configured such that turning off of said switch activates charging of said capacitor.

13. A carrier as claimed in claim 11, configured such that turning on of said switch allows said light source being powered by said capacitor.

14. A carrier as claimed in claim 1, wherein said carrier is a handbag, a shoulder bag, or a backpack.

15. An illumination system comprised in a carrier, comprising an inner lining providing a cavity in which items are situated, wherein said illumination system includes light transmitting fibers in or at said lining for illumination of the items in the cavity, a light source for feeding lighting to said fibers, a switch for controlling operation of said light source, and a power source for providing power for operation of said illumination system;
wherein:
said illumination system defines a circuitry including a charging circuit of a battery, said switch and a capacitor, and a discharging circuit of said capacitor, the switch and said light source, switching between the charging circuit and discharging circuit determines status of illumination, whereby turning off of said switch activates charging of said capacitor and turning on of said switch allows said light source being powered by said capacitor; and
the system is free of a timing chip.

16. A system as claimed in claim 15, wherein said lining is in the form of a fabric woven, knitting or other formed from materials including optical fibers.

17. A carrier comprising an inner lining arranged in said carrier, said lining providing a cavity in which items are carried in said carrier, wherein said carrier includes an illumination system having light transmitting fibers in or at said lining for illumination of the cavity, a light source for feeding lighting to said fibers or otherwise illumination in the cavity, a switch for controlling operation of said light source, a power source for providing power to said illumination system, and a capacitor for controlling duration of illumination of said light source, wherein said illumination system defines a circuitry including a charging circuit having a battery, said switch and said capacitor, and a discharging circuit having said capacitor, said switch and said light source, whereby switching between the charging and discharging circuits determines status of illumination; and said carrier further comprises a main body having a rim defining an access to the cavity whereby closing of said rim opens said charging circuit and closes said discharging circuit off.

18. A carrier as claimed in claim 17, wherein said circuitry is free of timing chip or relay.

* * * * *